United States Patent Office 3,415,802
Patented Dec. 10, 1968

3,415,802
POLYMERIZATION
Ralph C. Farrar, Bartlesville, Okla., assignor to Phillips Petroleum Company, a corporation of Delaware
No Drawing. Filed Mar. 18, 1965, Ser. No. 440,942
3 Claims. (Cl. 260—94.3)

ABSTRACT OF THE DISCLOSURE

Butadiene is polymerized to form polymers having substantially cis-1,4-addition by carrying out the polymerization in the presence of a catalyst system formed on mixing (1) an organoaluminum compound of the formula $R_2AlX$, (2) titanium tetraiodide or mixture thereof with titanium tetrachloride, and (3) an N,N-dialkyl fatty acid amide.

This invention relates to an improved polymerization system. In one aspect, this invention relates to an improved process for the formation of a polymerization catalyst system. In another aspect, this invention relates to an improved catalyst system for polymerizing butadiene.

It is known to polymerize butadiene in the presence of an initiator, or catalyst, formed on mixing an organoaluminum compound and titanium tetraiodide or a mixture of titanium tetraiodide with titanium tetrachloride. While these systems give high-cis-polybutadiene, there are frequently some difficulties in charging the titanium tetraiodide, particularly when it is added directly to the polymerization system. It is convenient to charge catalyst components in hydrocarbon solution, and this method is ordinarily used whenever possible. Titanium tetraiodide is not soluble to any appreciable extent in hydrocarbon. A dispersion of this material in a hydrocarbon diluent would tend to settle and the lack of homogeneity would make the quantity charged difficult to control.

An object of this invention is to provide an improved process for the polymerization of butadiene. Another object is to provide an improved polymerization catalyst. A further object is to provide a method for forming a polymerization catalyst whereby the contents and proportions of the system are readily controlled.

Other objects, advantages and the features of the invention will be apparent to those skilled in the art from the following discussion.

In accordance with this invention butadiene is polymerized in the presence of a catalyst system formed on mixing (1) an organoaluminum compound selected from the group consisting of $R_3Al$ and $R_2AlX$, wherein R is a saturated acyclic, saturated cyclic, or aromatic radical containing from 1 to 20 carbon atoms, and X is selected from chlorine, bromine, and iodine, (2) a titanium halide selected from the group consisting of titanium tetraiodide and mixtures of titanium tetraiodide with titanium tetrachloride, and (3) an N,N-dialkyl fatty acid amide which forms complex compounds with titanium tetrahalides, and the polymers obtained have a high percentage of cis-1,4-configuration.

The present invention provides a method for preparing a stable dispersion of titanium tetraiodide or mixtures thereof with titanium tetrachloride which does not impair its activity as a component in catalyst systems for the production of cis-polybutadiene. According to this process, titanium tetraiodide or a mixture containing same is brought into contact with an N,N-dialkyl fatty acid amide and a hydrocarbon diluent such as that employed in polymerization reactions. Upon thorough mixing of these materials a complex compound of the titanium tetrahalides forms with the amide, and a stable dispersion in the hydrocarbon diluent is obtained which can be used in this form as a catalyst component for butadiene polymerization. Polybutadiene prepared in the presence of the catalyst systems herein described has a predominantly cis-content. Products having 85 percent and higher cis-configuration are obtained by this process.

Preparation of the titanium tetraiodide dispersion can be accomplished at any temperature, for example in a range of −100° to 250° F. The titanium tetraiodide and the N,N-dialkyl fatty acid amide can be blended first and the hydrocarbon diluent then added to the complex compound or all three materials can be blended simultaneously. The ratio of amide to titanium tetraiodide is generally in the range of 1 to 10 mols per mol of titanium tetraiodide with 1 to 5 mols of the amide per mol of titanium tetraiodide being preferred.

The N,N-dialkyl fatty acid amides preferred for preparing stable dispersions of titanium tetraiodide are the N,N-dialkylamides of $C_6$ to $C_{20}$ saturated and unsaturated fatty acids wherein the alkyl radicals are the same or different n-alkyl radicals containing from 1 to 10 carbon atoms. They can be used singly or in mixtures of two or more of the compounds. Materials of this type are marketed by C. P. Hall Company and designated as Hallcomids. Specific examples of these amides include the following:

N,N-dimethylcaproamide,
N,N-dimethylcaprylamide,
N,N-dimethylcapramide,
N,N-dimethyllauramide,
N,N-dimethylmyristamide,
N,N-dimethylpalmitamide,
N,N-dimethyloleamide,
N,N-dimethyltridecanamide,
N,N-dimethylpentadecanamide,
N,N-dimethyl-2-hexenamide,
N,N-dimethyleicosanamide,
N-ethyl-N-decylmyristamide,
N,N-dioctyltridecanamide,
N-octyl-N-propylpentadecanamide,
N,N-dipropylcapramide, and
N,N-dihexylcapramide.

Organoaluminum compounds employed in the catalyst systems can be represented by the formulas $R_3Al$ and $R_2AlX$ wherein R is a hydrocarbon radical and X is a halogen as hereinbefore described. Illustrative of these compounds are the following:

trimethylaluminum,
triethylaluminum,
triisobutylaluminum,
tri-n-decylaluminum,
tri-sec-eicosylaluminum,
tribenzylaluminum,
triphenylaluminum,
tri-1-naphthylaluminum,
tri-4-tolylaluminum,
tricyclohexylaluminum,
tri(4-methylcyclohexyl)aluminum,
tri(4-butylcyclohexyl)aluminum,
tri(4-cyclohexylbutyl)aluminum,
dimethylaluminum chloride,
diethylaluminum chloride,
di-n-propylaluminum chloride,
di-tert-butylaluminum chloride,
di-n-hexylaluminum bromide,
didecylaluminum chloride,
di(tridecyl)aluminum iodide,
dieicosylaluminum chloride,
dicyclohexylaluminum chloride,
di-4-methylcyclohexylaluminum bromide,
dibenzylaluminum chloride, di(4-phenyl-n-butyl)aluminum chloride,
di-phenylaluminum chloride,
di-1-naphthylaluminum iodide,
di-4-tolylaluminum chloride,
di(2,4-diethylphenyl)aluminum chloride,
di(3,5-di-n-heptylphenyl)aluminum chloride,
methylethylaluminum chloride,
methylphenylaluminum chloride,
and butylbenzylaluminum chloride.

The mol ratio of organoaluminum compound to total titanium halide in the catalyst system is generally in the range of 1.25 to 20:1. The mol ratio of titanium tetrachloride to titanium tetraiodide is in the range of 0.5:1 to 5:1.

The concentration of catalyst used in the present process can vary over a rather wide range. The catalyst level is generally in the range of 1 to 20 gram-millimols of the organometal compound per 100 grams of monomer to be polymerized. The actual catalyst level used will in general be determined by the molecular weight of the product which is desired.

The polymerization is ordinarily conducted by bringing together the catalyst-producing components and the monomers and causing the recation to proceed in equipment of the type ordinarily used in the art for diene polymerization. The polymerization is conducted at a temperature in the range of −100° to 250° F., most frequently in the range of −30° to 160° F.

It is often desirable, from the standpoint of good heat-transfer and control of reaction mixture viscosity, to conduct the polymerization in the presence of a diluent or solvent for the monomer and polymer. Suitable diluents and solvents are hydrocarbons which are liquid under the reaction conditions. In general, these hydrocarbons are selected from the group consisting of paraffinic, cycloparaffinic, and aromatic hydrocarbons and include benzene, toluene, xylene, ethylbenzene, cyclohexane, methylcyclohexane, pentane, hexane, decane, and mixtures thereof.

The following examples will further illustrate the invention, although it is not intended that the examples be construed as unduly limiting thereof.

EXAMPLE I

Butadiene was polymerized in a series of runs in the presence of a catalyst system formed on mixing triisobutylaluminum, titanium tetraiodide and a mixture of N,N-dimethylamides derived from a mixture of $C_{12}$ to $C_{16}$ fatty acids (Hallcomid M-14, C. P. Hall Company). Approximate composition of the N,N-dimethylamide was as follows:

|  | Percent |
|---|---|
| N,N-dimethyllauramide | 2 |
| N,N-dimethylmyristamide | 95 |
| N,N-dimethylpalmitamide | 3 |

A stable dispersion of titanium tetraiodide was prepared first by mixing titanium tetraiodide and Hallcomid M-14 in a 1/2 mol ratio and adding toluene to make a dispersion that was 0.1 molard in $TiI_4$. Toluene was charged to the reactor after which it was purged with nitrogen. Butadiene was added followed by the triisobutylaluminum and then the titanium tetraiodide-Hallcomid M-14 dispersion. Quantities of catalyst components and polymerization temperatures were varied. Polymerization recipes and results are presented in Table I.

At the conclusion of the reaction period, each mixture was shortstopped with a solution of 2,2′-methylene-bis(4-methyl-6-tert-butylphenol) in a mixture of equal volumes of isopropyl alcohol and toluene, the amount used being sufficient to provide about one part by weight of the antioxidant per 100 weight parts of polymer. The polymer was then coagulated in isopropyl alcohol, separated, and dried.

TABLE I

|  | 1 | 2 | 3 | 4 | 5 | 6 | 7 | 8 |
|---|---|---|---|---|---|---|---|---|
| 1,3-butadiene, parts by wt | 100 | 100 | 100 | 100 | 100 | 100 | 100 | 100 |
| Toluene, parts by wt | 1,200 | 1,200 | 1,200 | 1,200 | 1,200 | 1,200 | 1,200 | 1,200 |
| Triisobutyl-aluminum, mmols | 2.0 | 2.5 | 3.0 | 3.5 | 4.0 | 2.5 | 3.5 | 3.5 |
| Titanium tetraiodide, mmols [1] | 0.4 | 0.4 | 0.4 | 0.4 | 0.4 | 0.8 | 0.8 | 1.6 |
| Temperature, °F | 41 | 41 | 41 | 41 | 41 | 122 | 122 | 122 |
| Time, hours | 18 | 18 | 18 | 18 | 18 | 2 | 2 | 2 |
| Conversion, percent | 85 | 76 | 63 | 55 | 48 | 88 | 80 | 87 |
| Inherent viscosity | 3.81 | 3.78 | 3.74 | 3.48 | 3.41 | 2.25 | 1.90 | 2.68 |
| Gel, percent | 0 | 0 | 0 | 0 | 0 | 0 | 0 | 0 |

[1] Charged as a 0.1 molar dispersion in toluene of $TiI_4$/Hallcomid M-14 in a ½ mol ratio.

The data show that gel-free polymers with a high cis-content were obtained. Analysis of microstructure of the polymer of Run 2 gave the following results: 96.0 percent cis, 1.0 percent trans, and 3 percent vinyl.

EXAMPLE II

The following recipe was employed for the polymerization of butadiene in the presence of a catalyst system formed on mixing diethylaluminum chloride, titanium tetraiodide, and Hallcomid M-14:

| | |
|---|---|
| 1,3-butadiene, parts by weight | 100 |
| Toluene, parts by weight | 1200 |
| Diethylaluminum chloride, mmols | Var. |
| Titanium, tetraiodide, mmol [1] | 0.4 |
| Temperature, °F. | 86 |
| Time, hours | 33 |

[1] Charged as a 0.1 molar dispersion in toluene of $TiI_4$/Hallcomid M-14 in a 1/2 mol ratio.

The procedure was the same as described in Example I. Two runs were made. Results were as follows.

|  | 1 | 2 |
|---|---|---|
| Conversion, percent | 92 | 90 |
| Inherent viscosity | 3.0 | 3.06 |
| Gel, percent | 0 | 0 |
| Microstructure, percent: | | |
| Cis | 86.8 | |
| Trans | 9.7 | |
| Vinyl | 3.5 | |

The data show that this polymerization system also produces a polymer with a high cis-content.

Microstructures were determined with a commercial infrared spectrometer. The samples were dissolved in carbon disulfide so as to form a solution containing 25 grams of polymer per liter of solution. The percent of the total unsaturation present as trans-1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters $^{-1}$). The percent of the total unsaturation present as cis-1,4-was obtained by substracting the trans-1,4- and 1,2- (vinyl) determined according to the above procedure from the theoretical unsaturation, assuming one double bond per each C$_4$ unit in the polymer.

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Determination of gel was made along with the inherent viscosity determination. A wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

As will be apparent to those skilled in the art, various modifications of this invention can be made without departing from the spirit and scope thereof.

I claim:
1. A process for producing a polymer of butadiene having predominantly cis-1,4-addition therein by polymerizing butadiene in the presence of a catalyst formed on mixing (1) an organoaluminum compound of the formula R$_2$AlX wherein R is a saturated acyclic, saturated cyclic and aromatic radical containing 1 to 20 carbon atoms and X is selected from the group consisting of chlorine, bromine and iodine and (2) a complex of a titanium halide selected from the group consisting of titanium tetraiodide and mixtures of titanium tetraiodide with titanium tetrachloride, and an N,N-dialkyl fatty acid amide of saturated and unsaturated fatty acids containing from 6 to 20 carbon atoms and wherein the alkyl portion is an n-alkyl group of from 1 to 10 carbon atoms.

2. A process according to claim 1 for polymerizing 1,3-butadiene wherein said polymerization temperature is within the range −100 to 250° F., the reaction is conducted in a hydrocarbon diluent medium, the ratio of aluminum compound to total titanium is in the range of 1.25 to 20:1 and the mol ratio of titanium tetrachloride to titanium tetraiodide is in the range of 0.5:1 to 5:1.

3. A process according to claim 2 wherein said fatty acid amide is a mixture of N,N-dimethyllauramide, N,N-dimethylmyristamide, and N,N-dimethylpalmitamide, said titanium halide is titanium tetraiodide, and said aluminum compound is triisobutylaluminum.

References Cited

UNITED STATES PATENTS

| | | | |
|---|---|---|---|
| 3,189,590 | 6/1965 | Coover et al. | 260—93.7 |
| 3,206,448 | 9/1965 | Naylor | 260—94.3 |
| 3,194,799 | 7/1965 | Coover et al | 260—93.5 |

FOREIGN PATENTS 940,125  10/1963  Great Britain.

JOSEPH L. SCHOFER, *Primary Examiner.*

R. A. GAITHER, *Assistant Examiner.*

U.S. Cl. X.R.

252—429